United States Patent [19]

Sommerfeld

[11] 4,258,451

[45] Mar. 31, 1981

[54] SURFACE SWEEPING MACHINE

[75] Inventor: George L. Sommerfeld, Minneapolis, Minn.

[73] Assignee: Tennant Company, Minneapolis, Minn.

[21] Appl. No.: 60,012

[22] Filed: Jul. 23, 1979

[51] Int. Cl.³ .............................................. A47L 9/20
[52] U.S. Cl. ........................................ 15/352; 55/300
[58] Field of Search ............... 15/347, 352, 340, 348, 15/349; 55/295, 300, 304

[56] References Cited

U.S. PATENT DOCUMENTS

| 934,042 | 9/1909 | Christoph | 55/300 |
|---|---|---|---|
| 1,268,304 | 6/1918 | Warren | 55/300 |
| 1,864,782 | 6/1932 | White | |
| 1,868,876 | 7/1932 | Boesger | |
| 3,368,331 | 2/1968 | Baxendale | 55/299 |
| 3,407,572 | 10/1968 | Tolley | 55/283 |
| 3,587,213 | 6/1971 | Tamny et al. | 55/300 |
| 3,639,940 | 2/1972 | Carlson et al. | 15/352 |
| 3,792,569 | 2/1974 | Carlson et al. | 55/288 |
| 3,847,576 | 11/1974 | Oberdank | 55/283 |

Primary Examiner—Christopher K. Moore
Attorney, Agent, or Firm—Merchant, Gould, Smith, Edell, Welter & Schmidt

[57] ABSTRACT

A sweeping machine is disclosed including a planar pleated filter and a striking mechanism for removing collected dust from the pleated filter. The striking mechanism includes an elongated strap which overlies the pleated filter. A rotatably driven eccentric weight drives the strap to strike the upper surface of the pleated filter.

16 Claims, 5 Drawing Figures

U.S. Patent  Mar. 31, 1981  Sheet 1 of 2  4,258,451
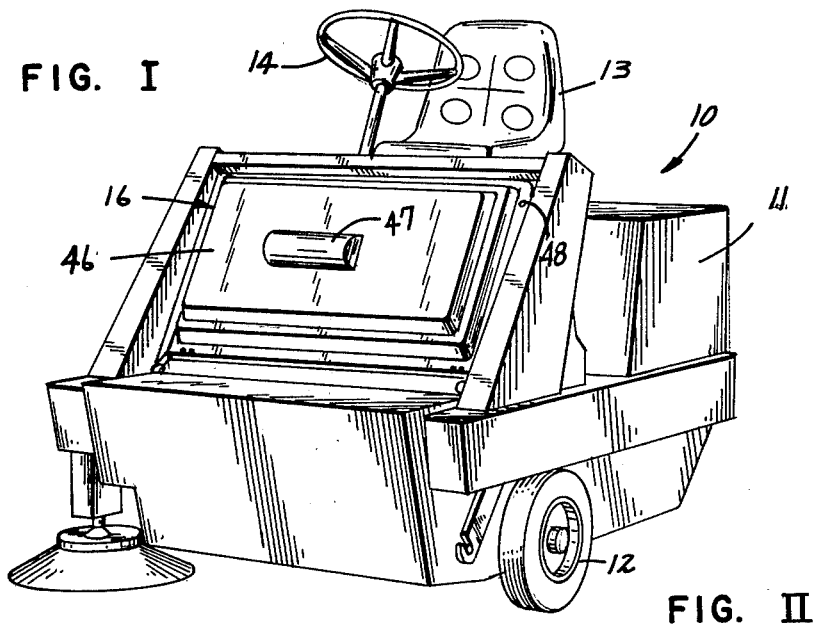
FIG. I
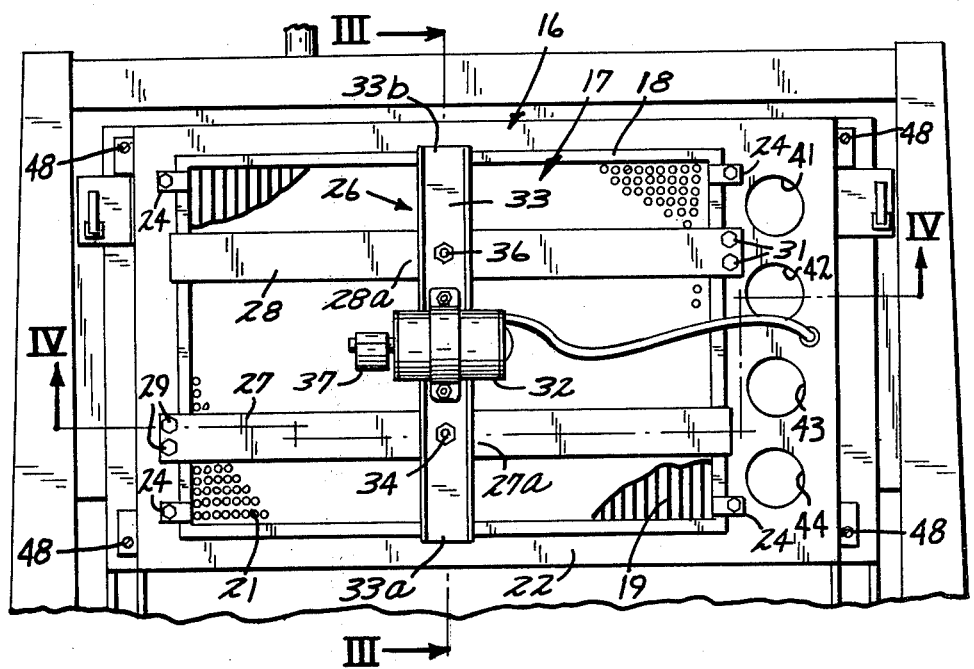
FIG. II

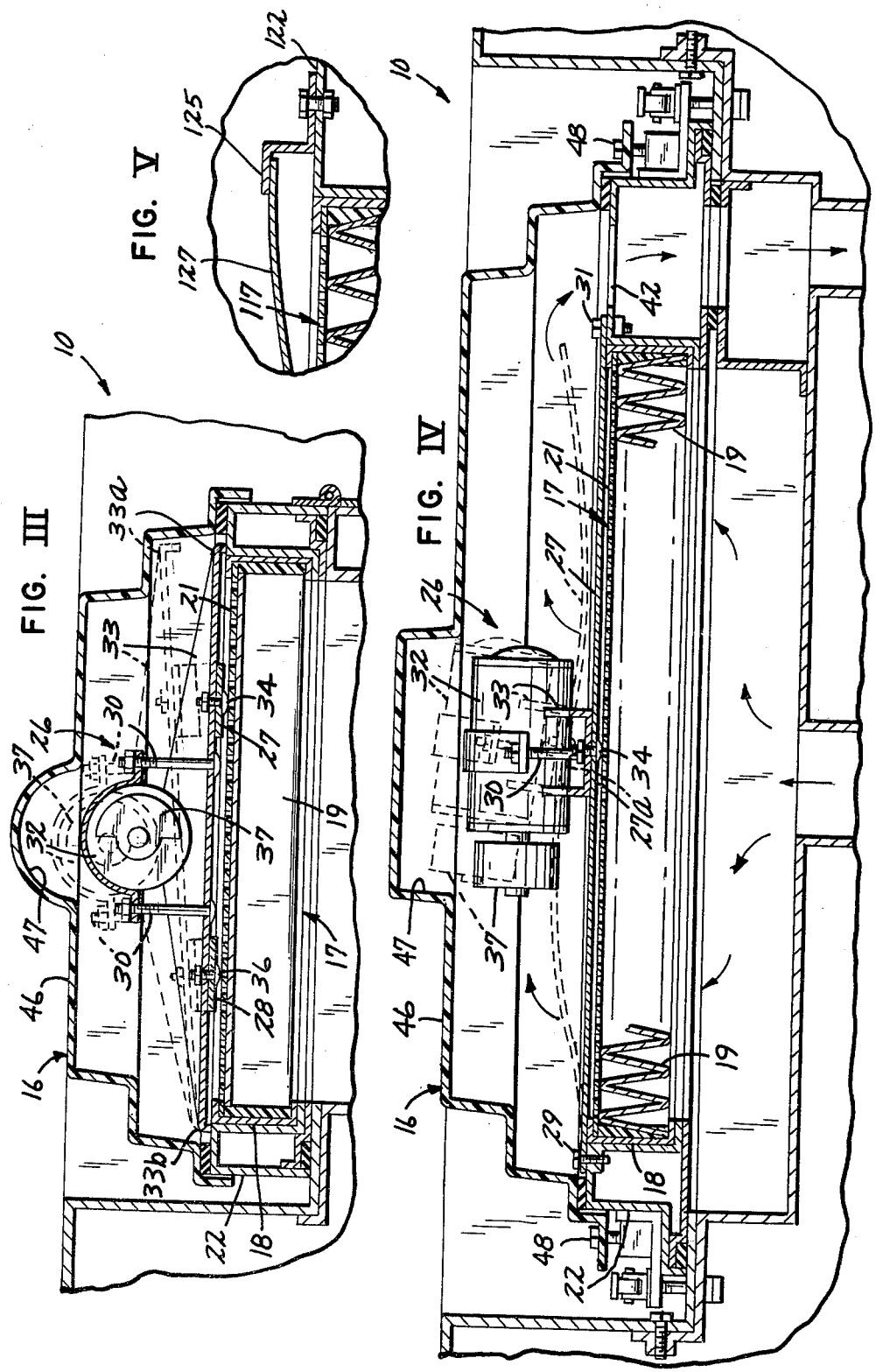

SURFACE SWEEPING MACHINE

TECHNICAL FIELD

The present invention relates to surface maintenance equipment and more particularly to surface maintenance equipment utilizing vacuum pumps for drawing a vacuum stream through such equipment. The present invention relates to such equipment including a filter for removing dust from such stream prior to passage through the vacuum pump.

BACKGROUND OF THE PRIOR ART

A wide variety of machines is available for use in maintenance of surfaces such as floors, parking lots and streets. These maintenance machines generally include sweeping machines and scrubbing machines. The sweeping machines utilize fans or pumps to draw a vacuum in the brush housing thereby minimizing dusting problems around the sweeping area. A problem which has been long existent in the prior art, is the accumulation of dust on the filter. As the dust accumulates, it tends to block the filter and create a substantial pressure differential between the upstream side of the filter and the downstream side of the filter. Such blockage reduces the dust controlling efficiency of the equipment. Many attempts have been made in the past to overcome such blockage problem generally by vibration or shaking of the filter. Such arrangements have improved the efficiency by removing the dust accumulations to a certain extent. The shaking of the filter, however, has not been as effective in removing the dust as would be desirable.

SUMMARY OF THE PRESENT INVENTION

The present invention provides a sweeper which may include a cylindrically shaped rotatable brush, a brush housing, a hopper and a vacuum pump. The brush housing surrounds a portion of the brush. The hopper opens from the brush housing. The vacuum pump draws a partial vacuum stream through the brush housing and generally also through the hopper. A filter is located between the hopper and the vacuum pump. The filter is planar in general overall configuration and includes a pleated filter medium. A striker is provided with repeatedly engages the upper edge of the pleats of the filter medium to create a shock wave across the filter medium thereby removing accumulated dust.

IN THE DRAWINGS

FIG. 1 shows a perspective view of the present invention;

FIG. II shows a top plan view of the filter structure of the present invention;

FIG. III shows a cross sectional view of the filter structure taken along the lines III—III in FIG. II;

FIG. IV shows a cross sectional view taken along the lines IV—IV in FIG. II; and FIG. V shows a modification of a portion of the filter structure of FIG. IV.

The present invention as illustrated in FIGS. I-IV relates to surface maintenance equipment commonly called sweepers. The sweeper 10 of the present invention may be generally of conventional design including a body portion 11 supported on a plurality of wheels such as 12. The body 11 may have a seat 13 on which an operator may ride and a steering mechanism 14 for control of the direction traversed by the equipment.

The sweeper 10 has a housing 16 which contains a filtering element 17 as illustrated in FIG. II. In this instance, the filter element 17 may be disposed in an inclined position, however, having a substantial horizontal component.

Various conventional aspects of the sweeper 10 are not specifically illustrated. For example, a vacuum pump is disposed within the body 11 for drawing a partial vacuum stream through the system. Also, a cylindrical brush is disposed beneath the housing 11 and in contact with the surface to be swept. The filter structure 17 may include a metal frame 18 which extends around the entire periphery of the panel filter. The frame 18 may be of light gauged metal such as aluminum. The filter 17 further includes a pleated panel filter medium 19 which is mounted in the frame 18. If desired, a perforated sheet metal member 21 may be disposed over the pleated panel 19.

The filter 17 may be suitably mounted in a portion 22 of frame 11. In other words, a well 23 may be defined in the frame 22 for reception of filter 17. Further, suitable structure such as the screw and tabs 24 may be provided to secure the filter in place.

A striker member 26 may be superimposed over the filter 17. The striker 26 includes at least one and preferably two straps such as 27, 28 which are in contact with the upper surface of the filter 17. The straps 27, 28 may be of any suitable material such as spring steel. The striker strap 27 may be secured at one end by screws 29 to the body member 22. The other end of strap 27 is free. The strap 28 is secured to the oposite side of body portion 22 such as by screws 31. The other end of strap 28 is free. The straps 27 and 28 may be in contact with the perforated sheet 21 or alternatively, if such a sheet is not present, straps 27 and 28 may be in direct contact with the upper edges of the pleats of filter medium 19.

The striker 26 has an electrically operated motor 32 which is mounted on a cross member 33 by bolts 30. Cross member 33 may be secured to the middle portion of straps 27, 28 such as by bolts 34 and 36. The ends of the straps 27, 28 and the cross member 33 may extend over the frame 18 of filter 17. The electrical motor 32 carries an eccentric weight 37.

The lower side of the filter 17 may communicate with the hopper of the sweeper 10. Alternatively, the lower side of filter 17 may communicate with the brush housing. The upper side of filter 17 communicates with a plurality of ducts 41, 42, 43 and 44 which lead to the vacuum pump. A cover 46 may be disposed over the filter 17 and striker 26 to provide an air tight chamber. A cavity 47 may be provided in cover 46 in which the electric motor 32 may be disposed. The cover 46 may be suitably held in place by screws 48. The spacing between cover 46 and the filter 17 is sufficient to permit appropriate movement of the motor 32 with an eccentric weight 37 as well as movement of the striker straps 27 and 28 as illustrated in FIGS. III and IV.

FIG. V illustrates a modification of the filter structure of FIG. IV. The filter structure 117 of FIG. V may be identical to that of FIG. IV with the exception that the ends of the striker straps, such as 127, are partially restrained in their upward movement. The end of strap 127 may be restrained by the stop 125 which is bolted to body member 122. The degree of restraint may be varied as desired. Of course, various other modifications may be made without departing from the broader scope of the present invention.

OPERATION OF THE INVENTION

Although operation of the invention would be apparent from the preceding description of the invention, it will be further detailed hereinafter in order to assure a more complete understanding of the present invention. During normal operation, an operator sits on the seat 13, starts the motor or engine and drives the sweeper 10 along the path to be swept. The operator controls the direction in which the sweeper moves by suitable manipulation of the steering wheel 14. The steering wheel 14 and associated mechanism controls the direction of the wheels such as 12. When the sweeper 10 is placed in operation, the cylindrical brush is rotatably driven to sweep up debris such as dirt and dust. Also, when the sweeper 10 is placed in operation, the vacuum pump is operated to draw a partial vacuum in the brush housing, on through the hopper and subsequently through the filter 17. The vacuum stream is then drawn through the ducts 41, 42, 43 and 44 to the vacuum pump. As a vacuum stream is drawn, of course, dust particles are stopped by the filter medium 19 and a layer of fine dust or dirt is accumulated on the lower surface of such filter medium 19. Once dust or dirt debris begins to collect on the filter medium 19, the striker 26 may be placed in operation by closing the electrical switch controlling current to motor 32. As the motor 32 rotatably drives the eccentric weight 37, the motor 32, the cross member 33 and the straps 27, 28 begin to move. As is illustrated in FIG. III, the eccentric weight may first move one end of cross member 33 upwardly, namely, end 33a, with the other end of cross member 33, namely, end 33b, remaining in contact with the filter 17. As the eccentric weight continues to rotate end 33a returns to engagement with filter 17 and the end 33b moves upwardly. In some instances, the cross member 33 may remain parallel with the filter 17 while moving up and down. The cross member 33 moves the center portions 27a and 28a of straps 27 and 28 alternately in an upward direction, thus, alternately raising and lowering the straps 27 and 28. FIG. IV illustrates the configuration of the movement of one of the straps 27. As illustrated, this configuration is in the form of a sine wave which produces a slapping like motion which rolls across the filter medium 19.

It has been found that very efficient removal of dust and dirt particles is obtained using the striker shown in the present invention. It is to be recognized that various modifications may be made in the details of the embodiment illustrated in FIGS. I–IV and in FIG. V without departing from the broader scope of the present invention. For example, one may provide a single strap rather than a pair of straps. Alternatively, additional straps may be added if so desired.

What is claimed:

1. A sweeper comprising a body structure, a plurality of wheels supporting said body structure, and a rotatable brush carried by said body structure, said body structure including a hopper, a vacuum pump and a dust filter, said hopper serving to store debris picked up by said sweeper, said vacuum pump serving to draw a partial vacuum around said brush, said dust filter being disposed between said vacuum pump and said brush to remove dust particles from said vacuum stream, said dust filter comprising a pleated planar filter medium, support means for said filter medium and a striker mechanism for removing accumulated dust from said filter medium, said striker mechanism including an elongated flexible member overlying said pleated filter medium, one end of said flexible member being fixed with respect to said body structure and the other end of said flexible member being free to move with respect to said body structure, eccentric drive mechanism attached to said flexible member at a point intermediate said fixed and said free ends whereby said striker mechanism may impart a shock to said filter medium and thereby dislodge said accumulated dust.

2. The sweeper of claim 1 wherein said elongated flexible member comprises at least one elongated metal strap extending substantially across said filter medium.

3. The sweeper of claim 2 wherein said metal strap is secured adjacent one end with respect to the filter support means and wherein the other end of said metal strap is free with respect to the filter support means.

4. The sweeper of claim 2 wherein said striker mechanism has two elongated metal straps and wherein said eccentric drive mechanism acts on both of said straps.

5. The sweeper of claim 4 wherein said eccentric drive mechanism comprises a motor and a single eccentric weight which drives both metal straps.

6. The sweeper of claim 2 wherein said metal strap is secured adjacent one end with respect to the filter support means and wherein the other end of said metal strap is partially restrained in movement with respect to said filter support means.

7. The sweeper of claim 4 wherein a cross member is secured to said two elongated metal straps intermediate the ends of said straps and wherein said cross member also serves to impart a shock to said filter medium.

8. Surface maintenance apparatus comprising a vehicle frame, means for sweeping debris from a surface, hopper means for storing said debris, a pump for creating a vacuum stream in said apparatus to transport said debris into said hopper, a filter disposed upstream of said pump to remove fine particulate material from said vacuum stream, said filter including a pleated planar porous filter medium, and at least one elongated strap overlying said planar porous filter, said strap being fixedly mounted at one end to said vehicle frame and the other end being free, and eccentric drive mechanism for driving said strap to repeatedly impart shock to said filter, thereby removing fine particles from said filter.

9. The surface maintenance apparatus of claim 8 wherein said apparatus has a pair of straps and a cross member secured to said straps.

10. The surface maintenance apparatus of claim 9 wherein one end of each of said straps is secured and wherein the other end of each of said straps is at least partially free to move.

11. The surface maintenance apparatus of claim 8 wherein said means for sweeping debris comprises rotatable brush means.

12. The surface maintenance apparatus of claim 11 wherein said rotatable brush means comprise a cylindrical brush.

13. Surface maintenance apparatus comprising a body structure, a plurality of wheels supporting said body structure, hopper means carried by said body structure for storing debris, pump means for creating an air stream in said apparatus to transport debris into said hopper, filter means disposed in said air stream to remove fine particulate material, said filter means comprising a pleated planar filter, an elongated flexible member overlying said pleated planar filter, one end of said flexible member being fixed with respect to said body structure and the other end of said flexible member being free to move with respect to said body structure, eccentric drive mechanism secured to said flexible member at a location between said ends, whereby said eccentric drive mechanism and flexible member serve to impart a shock to said filter thereby removing particles adhering to said filter.

14. The surface maintenance apparatus of claim 13 wherein said apparatus includes a rotatable brush means to assist in sweeping up the debris.

15. The surface maintenance apparatus of claim 13 wherein said filter means includes a metal frame which extends around the periphery of the medium.

16. The surface maintenance apparatus of claim 15 wherein said mechanical means comprise eccentric means including a striker member for repeatedly striking said filter means to remove adhering debris particles.

* * * * *